United States Patent [19]

Diefenbach et al.

[11] Patent Number: 4,554,212
[45] Date of Patent: Nov. 19, 1985

[54] BINDERS FOR CATHODICALLY DEPOSITABLE COATING COMPOSITIONS, A PROCESS FOR THEIR PREPARATION AND THEIR USE

[75] Inventors: Horst Diefenbach, Nottuln; Arnold Dobbelstein, Münster; Hans-Dieter Hille, Berg.-Gladbach, all of Fed. Rep. of Germany

[73] Assignee: BASF Farben & Fasern AG, Hamburg, Fed. Rep. of Germany

[21] Appl. No.: 636,082

[22] Filed: Aug. 1, 1984

Related U.S. Application Data

[63] Continuation of Ser. No. 385,933, Jun. 7, 1982.

[30] Foreign Application Priority Data

Jun. 13, 1981 [DE] Fed. Rep. of Germany ....... 3123536

[51] Int. Cl.$^4$ .............................................. B23B 27/38
[52] U.S. Cl. ................... 428/413; 204/181.7; 428/480; 428/500; 523/402; 523/414; 523/501; 524/457; 524/458; 524/460
[58] Field of Search ..................... 524/457; 204/181 C; 428/413, 480, 500

[56] References Cited

U.S. PATENT DOCUMENTS

| | | | |
|---|---|---|---|
| 3,245,939 | 4/1966 | Bergmeister et al. | 524/460 |
| 3,536,641 | 10/1970 | Sekmakas et al. | 523/501 |
| 3,684,758 | 8/1972 | Honig et al. | 524/457 |
| 3,793,278 | 2/1974 | DeBona | 523/402 |
| 3,804,786 | 4/1974 | Sekmakas | 204/181 C |
| 4,033,917 | 7/1977 | Sekmakas et al. | 523/402 |
| 4,064,087 | 12/1977 | Das | 524/460 |
| 4,075,135 | 2/1978 | Jozwiak, Jr. et al. | 524/460 |
| 4,096,105 | 6/1978 | McGinniss | 523/501 |
| 4,115,227 | 9/1978 | Hazan | 204/181 C |
| 4,148,772 | 4/1979 | Marchetti et al. | 523/414 |
| 4,150,006 | 4/1979 | Raudenbusch et al. | 523/414 |
| 4,285,789 | 8/1981 | Kobayashi et al. | 204/181 C |
| 4,337,185 | 6/1982 | Wessling et al. | 524/460 |
| 4,423,166 | 12/1983 | Moriarity et al. | 204/181 C |

Primary Examiner—Joseph L. Schofer
Assistant Examiner—Bernard Lipman
Attorney, Agent, or Firm—Wells & Wells

[57] ABSTRACT

The invention relates to binders for cathodically depositable coating compositions for the electrocoating lacquering process using cationic synthetic resins, which binders have been obtained by polymerizing (A) 5 to 95% by weight of ethylenically unsaturated polymerizable monomers in the presence of (B) 95 to 5% by weight of a cationic synthetic resin in an aqueous phase, the total amount of the components (A) and (B) being 100%. Esters of acrylic acid and/or methacrylic acid are preferable for use as component (A). The invention also relates to a process for preparing the binders and to their use for cathodically depositable electrocoating lacquers.

28 Claims, No Drawings

BINDERS FOR CATHODICALLY DEPOSITABLE COATING COMPOSITIONS, A PROCESS FOR THEIR PREPARATION AND THEIR USE

This application is a continuation of application Ser. No. 385,933, filed June 7, 1982.

BACKGROUND OF THE INVENTION

The invention relates to binders for cathodically depositable coating compositions for the electrocoating lacquering process using cationic synthetic resins.

The electrophoretic deposition of synthetic resins on electrically conductive substrates, which is called the electrocoating lacquering process, is known and is widely used. Here, in particular the cataphoretic process, in which cationic resins are deposited onto a substrate connected as the cathode, offers advantages which have been described in the literature and with which an expert is very familiar. The synthetic resins used as binders in the process can contain ammonium, sulfonium or phosphonium groups.

It is also known to use copolymers of monomers having basic groups and other monomers as binders for cationic electrocoating lacquers.

The synthetic resins mentioned have been described, for example in German Auslegeschrift No. 2,075,799, German Offenlegungsschrift No. 2,634,211, German Offenlegungsschrift No. 2,603,666 corresponding to U.S. Pat. No. 3,984,299, German Offenlegungsschrift No. 2,531,960, corresponding to U.S. Pat. Nos. 4,101,486 and 4,134,816, German Offenlegungsschrift No. 2,265,195 corresponding to U.S. Pat. Nos. 3,947,339; 4,017,438; 4,104,147; and 4,148,772, German Offenlegungsschrift No. 2,252,536, German Patent No. 1,546,840 corresponding to U.S. Pat. No. 3,455,806, German Patent No. 1,546,854 correspondng to U.S. Pat. No. 3,458,420, German Auslegeschrift No. 2,320,301, German Offenlegungsschrift No. 2,554,080, corresponding to U.S. Pat. No. 4,260,697, German Ausleges- chrift No. 1,930,949 corresponding to U.S. Pat. No. 3,729,435, German Offenlegungsschrift No. 2,707,482, corresponding to U.S. Pat. No. 4,320,220 and German Offenlegungsschrift No. 2,732,902, corresponding to U.S. Pat. No. 4,176,099.

As a rule, acids are used to neutralize the cationic resins completely or partially, in order to make them water-soluble or dispersible in water. The dispersions, if appropriate after pigmentation and addition of fillers, flow auxiliaries, low proportions of organic solvents and other known auxiliaries, can then be deposited, on application of a voltage, onto the substrate connected as the cathode. After stoving of the deposited film, a coating is thus obtained which protects against corrosion.

Commercially available emulsion polymers, although readily preparable by emulsion polymerization, cannot, as a rule, be used as binders for electrocoating lacquers.

SUMMARY OF THE INVENTION

The object of the present invention is to provide binders which can be prepared, at least partially, by the method of emulsion polymerization, which is readily carried out. These binders should produce coatings having high surface quality and good corrosion protection.

This object is achieved according to the invention with binders of the abovementioned type, which comprise the product obtained by polymerizing (A) 5 to 95% by weight of ethylenically unsaturated polymerizable monomers in the presence of
(B) 95 to 5% by weight of a saturated cationic synthetic resin in an aqueous phase, the total amount of the components (A) and (B) being 100%.

DESCRIPTION OF THE PREFERRED EMBODIMENTS

It was surprising that the binders according to the invention produce stable dispersions based on emulsion polymers, which are cathodically depositable and, after stoving, produce coatings having the good properties required in respect of surface quality and corrosion protection. It must be stressed here that the binders have properties which considerably differ from those obtained by mixing a commercially available emulsion polymer with a cationic resin. For these mixtures frequently show incompatibilities between the components. They cannot therefore be evenly deposited, or the resulting coatings have severe irregularities in their surface, such as, for example, craters.

A particular advantage of the binders according to the invention is that the thickness of the deposited film can be varied by the selection of the monomers and of the cationic resin and the choice of the ratio between them. Advantageously, the proportion of component (A) is 20 to 90% by weight and the proportion of component (B) is 80 to 10% by weight, the total amount of components (A) and (B) being 100%.

Possible examples of ethylenically unsaturated, polymerizable monomers (component A) are derivatives of acrylic acid or methacrylic acid, such as acrylates or methacrylates, for example methyl acrylate, butyl acrylate, methyl methacrylate or butyl methacrylate, acrylates or methacrylates having functional groups, such as, for example, hydroxyl groups, for example hydroxyethyl acrylate, hydroxypropyl acrylate or hydroxypropyl methacrylate, having epoxide groups, such as, for example, glycidyl acrylate or glycidyl methacrylate, and having tertiary amino groups, such as, for example, dimethylaminoethyl acrylate or dimethylaminopropyl acrylate. Also possible are acrylonitrile, methacrylamide, methylolacrylamide or methylolmethacrylamide, or etherified derivatives thereof. Small amounts of acrylic acid or methacrylic acid can also be present. Also possible are vinyl aromatics, such as, for example, styrene, vinyltoluene, vinyl esters, such as, for example, vinyl acetate, vinyl propionate or vinyl esters of α-alkylcarboxylic acids, ethylene, propylene, butadiene, vinyl chloride, vinylidene chloride, vinylpyridine, vinylcarbazole or the like.

Preferable monomers are the esters of acrylic acid and/or methacrylic acid. A mixture of ($a_1$) 10 to 99% by weight of esters of acrylic acid and/or methacrylic acid, ($a_2$) 1 to 30% by weight of ethylenically unsaturated compounds having functional groups and ($a_3$) 0 to 80% by weight of other monomers is very particularly preferable for use as component (A).

Possible cationic synthetic resins (component B) are resins having ammonium, sulfonium or phosphonium groups. In principle, the groups can be chemically bonded to a wide variety of resin radicals, such as, for example, epoxide resins, acrylate resins, polyester resins, polyurethane resins, polyether resins or polyamide resins.

The cationic synthetic resin can have been prepared, for example, by the following reactions:

(a) reaction of resins having activated double bonds with secondary or primary amines;
(b) reaction of resins having OH or COOH groups with isocyanates containing tertiary amino groups;
(c) reaction of polyalcohols or polyamines containing tertiary amino groups with polyisocyanates;
(d) reaction of ethylenically unsaturated compounds containing tertiary amino groups (aminoacrylates) with other copolymerizable monomers;
(e) reaction of tertiary polyalcohols or polyamines containing tertiary amino groups with polycarboxylic acids or their condensable derivatives; and
(f) reaction of polyphenols with formaldehyde and amine to form Mannich bases.

Resins which are particularly preferable synthetic resins for use as component (B) have been obtained by reaction of a resin containing epoxide groups, in particular based on bisphenol A, with amines, ammonium salts, sulfide/acid mixtures and/or phosphine/acid mixtures.

The resins, in addition to the groups mentioned, can contain further reactive groupings, such as, for example, hydroxyl groups, amino groups and blocked isocyanate groups. Some of these groups can react and crosslink during stoving. This gives the coating particularly valuable properties.

Up to 50% by weight of other resins which are not miscible with water, such as, for example, polyesters, epoxide resins or polyurethane resins, can be admixed to the cationic resins. The admixed resins and, if appropriate, also admixed low molecular weight components can contain reactive groups, so that they act as crosslinking agents on stoving.

The resin systems mentioned and their preparation are known to an expert. They are not the subject of the invention, and they therefore need not be described in more detail.

The process according to the invention for preparing binders for cathodically depositable coating compositions for the electrocoating lacquering process comprises mixing
(A) 5 to 95% by weight of ethylenically unsaturated, polymerizable monomers with
(B) 95 to 5% by weight of a cationic synthetic resin, the total amount of the components (A) and (B) being 100%, and carrying out a polymerization of the monomers in an aqueous phase.

The polymerization is advantageously carried out using free radicals and initiated by compounds which form free radicals. The compounds used to form free radicals can be not only water-soluble compounds, such as $H_2O_2$ and potassium persulfate, but also compounds which are sparingly soluble in water, such as azobisisobutyrodinitrile or organic peroxides.

In a preferable embodiment of the process, the mixture of the components (A) and (B) is emulsified in water, if appropriate with added emulsifiers, and this emulsion is passed with stirring into heated water and, at the same time, the free-radical former is passed into the water separately from the emulsion.

The process can also be carried out advantageously by stirring the mixture of the components (A) and (B) into heated water and thereafter passing in, with stirring, the free-radical former.

The reaction thus carried out is an emulsion polymerization in which the cationic resin takes over the role of an otherwise customary emulsifier. However, if desired an additional emulsifier can be used. For this purpose the following compounds are suitable:
1. Invert soaps: cetylamine hydrochloride and salts of other fatty amines with strong acids.
2. Non-ionic emulsifiers which can be prepared by reacting long-chain alcohols or alkylated phenols with ethylene oxide (ethoxylation).

Emulsion polymerization is in itself well known to an expert. He will therefore choose the process conditions which are suitable according to the type of monomers used.

Below, the invention is illustrated in more detail by means of Examples. Parts are parts by weight.

Preparation of a polyurethane crosslinking agent

In a reactor, 218 parts by weight of 2-ethylhexanol were slowly added, with stirring and in a nitrogen atmosphere, to 291 parts by weight of an 80/20 mixture of isomers of 2,4-/2,6toluylene diisocyanate, during which addition the reaction temperature was maintained below 38° C. by external cooling. The batch was kept at 38° C. for a further ½ hour and was then warmed to 60° C., whereupon 75 parts by weight of trimethylolpropane and then 0.08 part of dibutyltin dilaurate, as catalyst, were added. After an exothermal reaction at the beginning, the batch was maintained for 1.5 hours at 121° C., until, essentially, all the isocyanate groups had been consumed, as could be seen from the infrared spectrum. The batch was then diluted with 249 parts of ethylene glycol monobutyl ether.

Preparation of a cationic resin

970 Parts by weight of a commercially available polyglycidyl ether based on bisphenol A and having an epoxy equivalent weight of 485 and 265 parts by weight of a commercially available polycaprolactonediol (PCP 0200 from Union Carbide Corporation) were added to a suitable reactor. This batch was heated in a nitrogen atmosphere to 100° C., and 0.40 part by weight of benzyldimethylamine was added. The reaction mixture was further heated to 130° C. and maintained for about 1.5 hours at this temperature. The batch was then cooled down to 110° C., and 110 parts by weight of methyl isobutyl ketone were added to the reaction vessel. 39.8 Parts by weight of a 73% strength solution of the methyl isobutyl diketimine of diethylenetriamine in methyl isobutyl ketone and thereafter 100 parts by weight of methyl isobutyl ketone were then added. The batch was cooled until it had reached a temperature of 70° C.; 53.1 parts by weight of diethylamine were then added, and the batch was again heated to 120° C. and kept for 3 hours at this temperature.

310 Parts by weight of the polyurethane crosslinking agent and 13.2 parts of dibutyltin dilaurate catalyst were admixed to 576 parts of the above polyether chain-lengthened by polycaprolactonediol. The mixture was then neutralized with 12.3 parts of acetic acid and slowly diluted with 1,033 parts by weight of deionized water.

Preparation of a binder according to the invention 1,248 g of deionized water are initially introduced into a 3 l glass reaction vessel which is equipped with a stirrer, thermometer, reflux condenser and a 2 l capacity feed vessel.

Amounts of the following components are weighed out and successively added, with stirring, to the 2 l feed vessel:

1. 833 g of cationic resin, as described above
2. 450 g of styrene
3. 450 g of butyl acrylate
4. 19 g of azobisisobutyrodinitrile (Porofor N)

On the water reaching 80° C., the pre-emulsion prepared in the feed vessel, and which is continuously being stirred, is metered into the course of 2 hours at a uniform rate into the reaction vessel, the temperature being maintained at 80° C. It is kept for a further 2 hours at 80° C. A stable dispersion having a solids content of 40% is obtained.

To prepare a lacquer which is depositable on the cathode, 1,000 g of the binder according to the invention were mixed with 40 g of monoethylene glycol ethyl hexyl ether and 960 g of demineralized water. The resulting lacquer had a pH value of 5.95.

A degreased sheet of steel connected as the cathode was coated at 200 V in the course of 2 minutes and then stoved for 20 minutes at 190° C. A smooth uniform 50 μm thick film was obtained. On scratching and action of a salt mist at 38° C., in accordance with ASTM D-117-73, the sheet showed subcoating rust development at the scratch of only 0.6 mm after 14 days.

Preparation of a pigment dispersion

A cationic pigment dispersion was prepared by first mixing 138 parts of an alkylimidazoline (Geigy Amine C), 31 parts of acetic acid, 138 parts of ethylene glycol monobutyl ether and 383 parts of deionized water. 100 parts of this dispersing agent were mixed with 40 parts of a commercially available acetylene alcohol (Surfynol 104 A from Air Products and Chemicals Inc.), 260 parts of deionized water, 134 parts of anthracite coal (325 mesh, U.S. Standard), 40 parts of lead silicate, 20 parts of strontium chromate and 6 parts of a commercially available clay (Benagel EW from National Clay). The resulting slurry was reduced in a suitable mill down to a Hegmann fineness No. 7.

To prepare a pigmented lacquer, 750 parts of the binder according to the invention, 300 parts of the pigment dispersion and 945 parts of deionized water were mixed. The pH value was 5.8.

On cathodic deposition at 200 V for 2 minutes onto sheets of steel treated with Zn phosphate and after subsequent hardening at 190° C. for 20 minutes, smooth, hard and flexible films having a thickness of 23 μm were obtained.

We claim:

1. A method of electrocoating a substrate comprising cathodically depositing on said substrate a coating composition consisting essentially of a cationic synthetic resin binder which is the emulsion polymerization product of:
   (A) 5 to 95% by weight of ethylenically unsaturated polymerizable monomers with
   (B) 95 to 5% by weight of a cationic synthetic resin, the total amount of components (A) and (B) being 100%,
   wherein component (A) is an ester selected from the group consisting of an alkyl ester of acrylic acid, an alkyl ester of methacrylic acid or a mixture thereof, said esters having an alkyl group containing 1 to 4 carbon atoms or component (A) is a mixture of
   ($a_1$) 10 to 99% by weight of an alkyl ester of acrylic acid, an alkyl ester of methacrylic acid or a mixture thereof said esters having an alkyl group containing 1 to 4 carbon atoms; and
   ($a_2$) 1 to 30% by weight of ethylenically unsaturated compounds having functional groups selected from the group consisting of derivates of esters of methacrylic acid containing hydroxyl groups, esters of methacrylic acid having epoxide groups, esters of methacrylic acid having tertiary amino groups, esters of acrylic acid containing hydroxyl groups, esters of acrylic acid having epoxide groups, esters of acrylic acid having tertiary amino groups and mixtures thereof;
   the total amount of the components ($a_1$) and ($a_2$) being 100%,
   and component (B) is a resin selected from the group consisting of epoxide resins having ammonium groups, epoxide resins having sulfonium groups, epoxide resins having phosphonium groups, acrylate resins having ammonium groups, acrylate resins having sulfonium groups, acrylate resins having phosphonium groups, polyester resins having ammonium groups, polyester resins having sulfonium groups, polyester resins having phosphonium groups, polyurethane resins having ammonium groups, polyurethane resins having sulfonium groups, polyurethane resins having phosphonium groups, polyether resins having ammonium groups, polyether resins having sulfonium groups, polyether resins having phosphonium groups, polyamide resins having ammonium groups, polyamide resins having sulfonium groups, polyamide resins having phosphonium groups, polyurea resins having ammonium groups, polyurea resins having sulfonium groups, polyurea resins having phosphonium groups and mixtures thereof;
   and stoving said cathodically deposited binder.

2. A method of electrocoating a substrate comprising cathodically depositing on said substrate a coating composition consisting essentially of a cationic synthetic resin binder which is the emulsion polymerization product of:
   (A) 5 to 95% by weight of ethylenically unsaturated polymerizable monomers with
   (B) 95 to 5% by weight of a cationic synthetic resin, the total amount of components (A) and (B) being 100%,
   wherein component (A) is a mixture of
   ($a_1$) 10 to 99% by weight of an alkyl ester of acrylic acid, an alkyl ester of methacrylic acid or a mixture thereof said esters having an alkyl group containing 1 to 4 carbon atoms;
   ($a_2$) 1 to 30% by weight of ethylenically unsaturated compounds having functional groups selected from the group consisting of derivates of esters of methacrylic acid containing hydroxyl groups, esters of methacrylic acid having epoxide groups, esters of methacrylic acid having tertiary amino groups, esters of acrylic acid containing hydroxyl groups, esters of acrylic acid having epoxide groups, esters of acrylic acid having tertiary amino groups and mixtures thereof; and
   ($a_3$) 1 to 80% by weight of other ethylenically unsaturated polymerizable monomers selected from the group consisting of aliphatic vinyl compounds, vinyl esters, vinyl esters and α alkyl carboxylic acids, vinyl aromatics, acrylic monomers, and methacrylic monomers, the total amount of the components (a₁), (a₂), and (a₃) being 100%, and component (B) is a resin selected from the group consisting of epoxide resins having ammonium groups, epoxide resins having sulfonium groups, epoxide resins having phosphonium groups, acrylate resins having ammonium groups, acrylate resins having sulfonium groups, acrylate resins having phosphonium groups, polyester resins having ammonium groups, polyester resins having sulfonium groups, polyester resins having phosphonium groups, polyurethane resins having ammonium groups, polyurethane resins having sulfonium groups, polyurethane resins having phosphonium groups, polyether resins having ammonium groups, polyether resins having sulfonium groups, polyether resins having phosphonium groups, polyamide resins having ammonium groups, polyamide resins having sulfonium groups, polyamide resins having phosphonium groups, polyurea resins having ammonium groups, polyurea resins having sulfonium groups, polyurea resins having phosphonium groups and mixtures thereof;

and stoving said cathodically deposited binder.

3. The method of claim 1, wherein said cationic synthetic resin binder is a polymerization product which has been produced in a radical initiated emulsion polymerization in aqueous phase.

4. The method of claim 2, wherein said cationic synthetic resin binder is a polymerization product which has been produced in a radical initiated emulsion polymerization in aqueous phase.

5. The method of claim 3, wherein component (B) functions as an emulsifying agent in said emulsion polymerization.

6. The method of claim 4, wherein component (B) functions as an emulsifying agent in said emulsion polymerization.

7. The method of claim 5, wherein further emulsifying agents are added.

8. The method of claim 6, wherein further emulsifying agents are added.

9. The method of claim 3, wherein in said emulsion polymerization the mixture of the components (A) and (B) is emulsified in water and this emulsion is passed with stirring into heated water and, simultaneously, a free-radical former is passed into the water separately from the emulsion.

10. The method of claim 4, wherein in said emulsion polymerization the mixture of the components (A) and (B) is emulsified in water and this emulsion is passed with stirring into heated water and, simultaneously, a free-radical former is passed into the water separately from the emulsion.

11. The method of claim 3, wherein in said emulsion polymerization the mixture of the components (A) and (B) is stirred into heated water and thereafter the initiator is passed in with stirring.

12. The method of claim 4, wherein in said emulsion polymerization the mixture of the components (A) and (B) is stirred into heated water and thereafter the initiator is passed in with stirring.

13. The method of claim 1, wherein the proportion of component (A) is 20 to 90% by weight and the proportion of component (B) is 80 to 10% by weight.

14. The method of claim 2, wherein the proportion of component (A) is 20 to 90% by weight and the proportion of component (B) is 80 to 10% by weight.

15. The method of claim 1, wherein said alkyl ester of methacrylic acid is methylmethacrylate.

16. The method of claim 1, wherein said alkyl ester of methacrylic acid is butyl methacrylate.

17. The method of claim 1, wherein said alkyl ester of acrylic acid is methylacrylate.

18. The method of claim 1, wherein said alkyl ester of acrylic acid is butyl acrylate.

19. The method of claim 1, wherein said ethylenically unsaturated compounds having functional groups are selected from the group consisting of hydroxyethyl methacrylate, hydroxylpropyl methacrylate, glycidylmethacrylate, dimethylaminoethyl methacrylate, dimethylaminopropyl methacrylate, hydroxyethyl acrylate, hydroxypropyl acrylate, glycidyl acrylate, aminoethyl acrylate, and dimethylaminopropyl acrylate.

20. The method of claim 2, wherein said other ethylenically unsaturated polymerizable monomers are selected from the group consisting of methacrylonitrile, methacrylamide, methylol methacrylamide respectively the etherified derivates thereof, methacrylic acid, styrene, vinyltoluene, vinyl acetate, vinyl propionate, ethylene, propylene, butadiene, vinyl chloride, vinylidene chloride, vinylpyridine, vinylcarbazole, acrylonitrile, acrylamide, methylol acrylamide respectively the esterified derivates thereof, and acrylic acid.

21. The method of claim 1, wherein said component (B) has been obtained by reacting a resin containing epoxide groups with compounds selected from the group consisting of amines, ammonium salts, sulfide/acid mixtures, phosphine/acid mixtures and mixtures thereof.

22. The method of claim 2, wherein said component (B) has been obtained by reacting a resin containing epoxide groups with compounds selected from the group consisting of amines, ammonium salts, sulfide/acid mixtures, phosphine/acid mixtures and mixtures thereof.

23. The method of claim 21, wherein said resin containing epoxide groups is a polyglycidyl ether of bisphenol A.

24. The method of claim 22, wherein said resin containing epoxide groups is a polyglycidyl ether of bisphenol A.

25. The method of claim 1, wherein said coating composition contains a cross-linking agent for the cationic synthetic resin binder which has been obtained by reacting 2-ethylhexanol, trimethylolpropane and toluylendiisocyanate.

26. The method of claim 2, wherein said coating composition contains a cross-linking agent for the cationic synthetic resin binder which has been obtained by reacting 2-ethylhexanol, trimethylolpropane and toluylendiisocyanate.

27. A substrate coated by the method of claim 1.

28. A substrate coated by the method of claim 2.

* * * * *